R. H. SAYRE.
AERIAL NAVIGATION PROTRACTOR.
APPLICATION FILED FEB. 8, 1918.
1,296,704.
Patented Mar. 11, 1919.
2 SHEETS—SHEET 1.
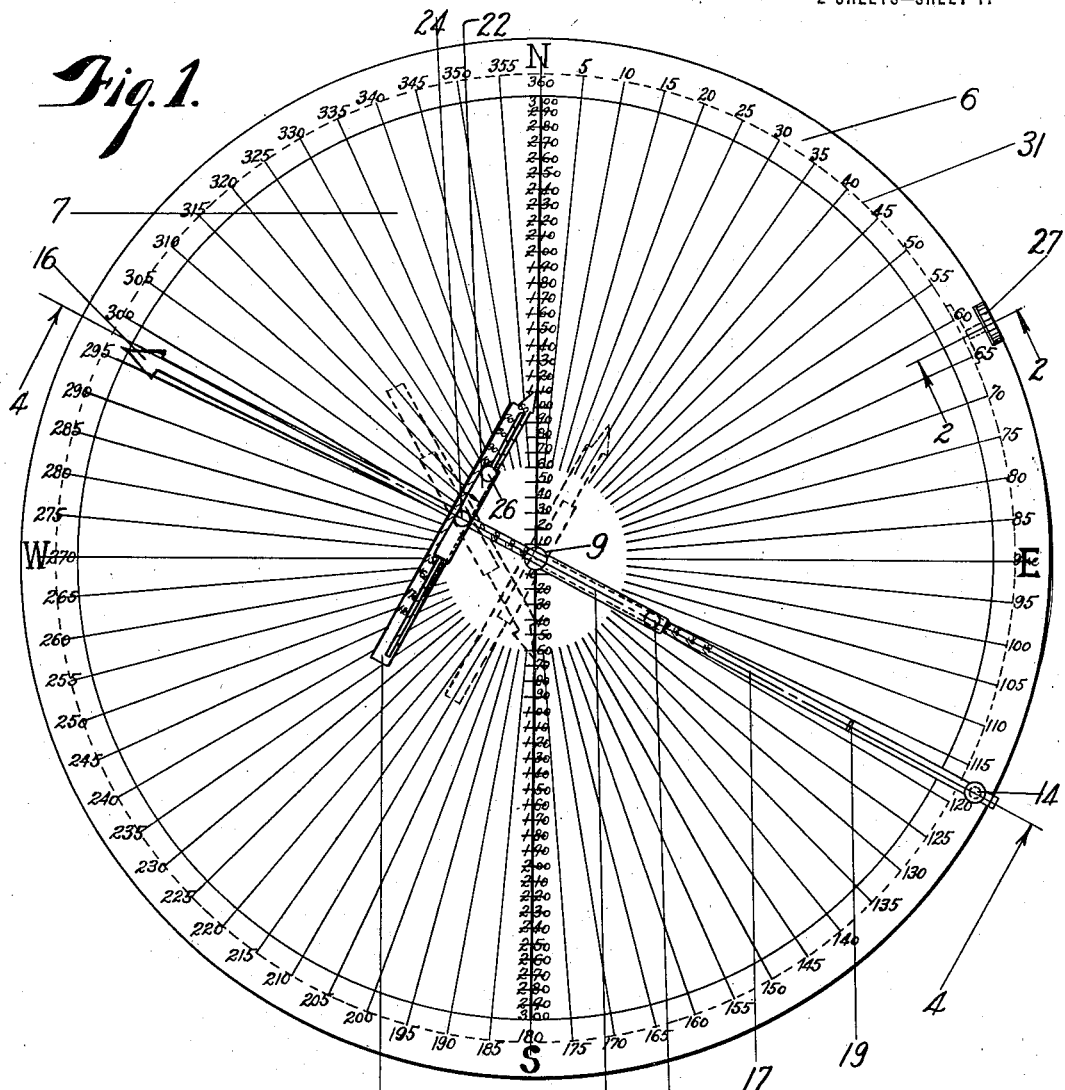
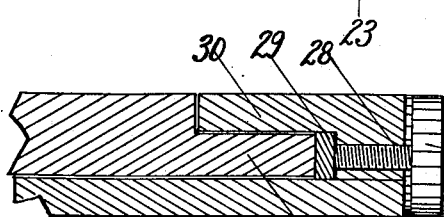
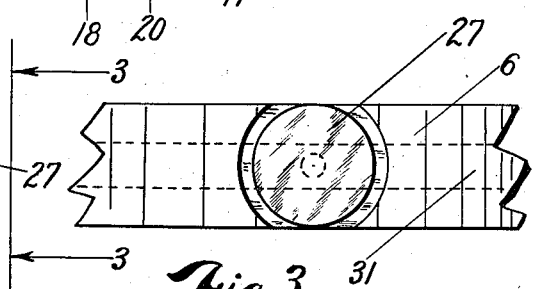
Inventor
R. H. SAYRE.
By
Attorney

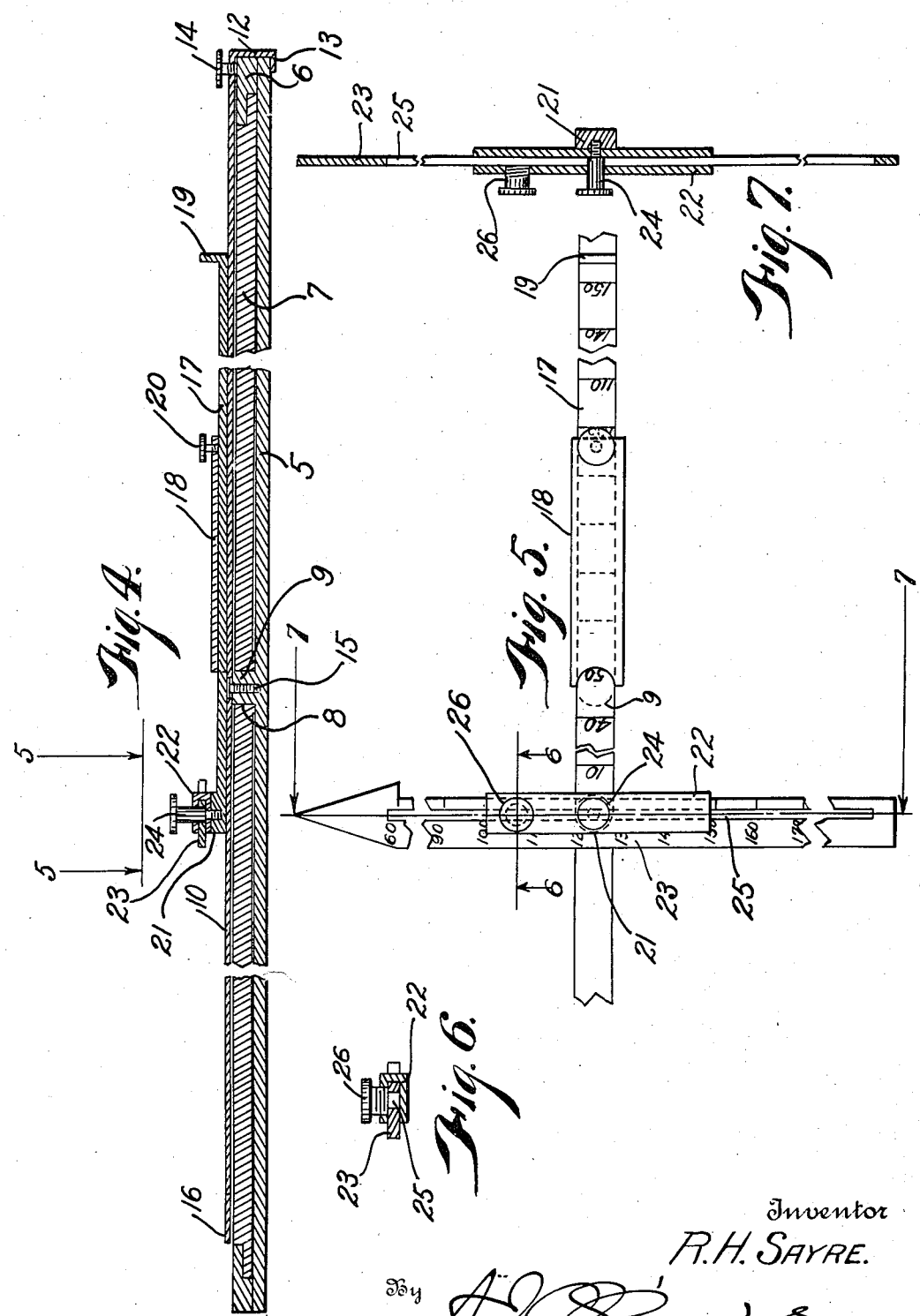

UNITED STATES PATENT OFFICE.

ROBERT H. SAYRE, OF CENTRAL CITY, COLORADO.

AERIAL-NAVIGATION PROTRACTOR.

1,296,704.  Specification of Letters Patent.  Patented Mar. 11, 1919.

Application filed February 8, 1918. Serial No. 216,074.

*To all whom it may concern:*

Be it known that I, ROBERT H. SAYRE, a citizen of the United States, residing at Central City, county of Gilpin and State of Colorado, have invented certain new and useful Improvements in Aerial-Navigation Protractors; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an instrument which I prefer to call an aerial navigator or an aerial navigation protractor, being an instrument for the determination of the compass course which an aeroplane should assume to go straight to its destination and the actual speed in miles per hour which it will make along this course, the direction of the desired destination, the normal speed of the aeroplane in miles per hour, the direction in which the wind is blowing and the velocity of the wind in miles per hour being known. My improved instrument enables the person about to make a flight to quickly and easily ascertain the aforesaid factors to be determined, namely, the compass course of the aeroplane and its actual speed when the other four factors are known.

Hence, my object is to provide a compact, simple, portable, little instrument to solve problems in aerial navigation quickly and accurately by mechanical means without the trouble heretofore necessary and which has required that the aviator, contemplating a trip to a given destination or in a given direction, was compelled to use pencil, paper, a protractor, a graduated rule, a drafting table, etc., before starting out.

The problem to be solved in every case is the same and involves the six variable factors heretofore noted, three of direction and three of velocity. Four of these are always known, while the other two must be determined.

Briefly the invention comprises an outer ring on which are indicated the points of the compass and the 360° of a circle, and an inner disk mounted to rotate within the ring. The disk is provided with radial lines corresponding with the degree indications of the ring. One diametral line is distinguished from the radial lines by being graduated from the center to each end to indicate the actual rate of flight. Also, this line is to be pointed in the direction of the destination. A bar is pivoted at the axis of the disk to be pointed in the direction of the wind and provided with a slide having graduations thereon to indicate the velocity of the wind. A holder, in which an arrow is slidably mounted, is pivoted or jointed to one end of the slide. The arrow is provided with graduations to indicate the normal rate of flight of the machine, the point of the arrow being adapted to be placed on the line indicating the actual rate of flight. Thus, the various graduations being properly related, when the device has been set for the proper directions and for the rate of the machine and the velocity of the wind, the resultant or actual rate of flight may be read off directly. By moving the arrow to the center without changing its angle the direction of flight to be taken may be readily determined.

Having briefly outlined my improvement, I will proceed to describe the same in detail, reference being made to the accompanying drawing in which one embodiment of the instrument is illustrated. In this drawing:

Figure 1 is a top or plan view of my improved instrument.

Fig. 2 is a section taken on the line 2—2, Fig. 1, the parts being shown on a larger scale.

Fig. 3 is a fragmentary view of the structure looking in the direction of arrows 3, Fig. 2.

Fig. 4 is a cross section taken on the line 4—4, Fig. 1, the parts being shown on a larger scale and partly broken away for lack of room on the sheet.

Fig. 5 is a fragmentary top plan view of the bar employed to indicate the direction of the wind and the part jointed thereto or pivotally connected therewith.

Fig. 6 is a section taken on the line 6—6, Fig. 5, viewed in the direction of the arrows.

Fig. 7 is a section taken on the line 7—7, Fig. 5, looking toward the left.

The same reference characters indicate the same parts in all the views.

Let the numeral 5 designate a bottom plate which is circular in shape and to which is secured in any suitable manner a ring 6 which is graduated and numbered to indicate the 360° of a circle. As shown in the drawing, these numbers increase by a common difference of five around the circumference of the ring. Within this ring and pivotally mounted on the base 5 is a disk 7 which is provided with a central perforation 8 through which passes a projection 9 formed integral with the base, whereby the disk is free to rotate. This disk is provided with radial lines which are in alinement with short graduations formed on the ring, the outer extremities of the radial lines pointing to the numbers which designate the degrees of the circle. Consequently, there are 72 radial lines formed on the disk or 36 diametrical lines, though the radii, as shown in Fig. 1 of the drawing, terminate short of the center of the disk in order to avoid confusion due to the proximity of the inner portions of the radii if they were carried to the center. This feature of illustration is for convenience only, as will be readily understood.

The ring 6 is further marked at the extremities of one of the diametrical lines with the letters N and S to designate north and south respectively. This particular line is continued to the central pivot of the disk and is made heavy in order to distinguish it from the other lines and for a purpose which will be hereinafter explained. The letters E and W are placed on the ring in their proper positions intermediate the letters N and S, the four letters, of course, indicating the four cardinal points of the compass.

The two radii forming the heavy diametrical line of the disk at whose outer extremities the letters N and S are located are each graduated and numbered progressively from their inner extremities from 10 to 300, these numbers increasing by a common difference of 10. Pivotally mounted upon the disk, the axis of the pivot coinciding with that of the disk is a bar 10 which is preferably quite long and arranged to overlap the ring 6 at one extremity and extend downwardly, as shown at 12 and underneath the base 5, as shown at 13, a set screw 14 passing therethrough and extending into the ring or against the ring for the purpose of securing the bar in the desired position of adjustment. As shown in the drawing, the bar is centrally connected for pivotal purposes with the pivot 9 of disk by means of a screw 15 which is threaded into the pivot 9 and passes through a plain or unthreaded opening formed in the bar. The extremity of this bar opposite the set screw 14 is formed into an arrow 16 whose point extends to the outer circumferences of the disk, and consequently, is always immediately adjacent the inner circumference of the ring to facilitate wind-direction readings in degrees on the circle of the ring, as hereinafter more fully explained.

Mounted on the bar 10 and extending and movably longitudinally thereof, is a slide 17 which is held in coöperative relation with the bar by a sleeve 18 which is preferably formed integral with the bar and extends above the same forming a space between its top and the bar sufficient for the introduction of the slide 17. This slide has an upward projection 19 at its outer extremity for convenience of adjustment on the bar and is held in the desired position of adjustment by a set screw 20 which is threaded into the sleeve and whose inner extremity bears against the slide. The extremity of the slide opposite the manipulating projection 19 is slightly reinforced, as shown at 21, and to it is secured a holder 22 in which is slidably mounted a member 23 which I will term the arrow. The arrow holder 22 is secured to the inner extremity of the slide by means of a screw 24 which passes through a holder and is threaded into the slide. The shank of this screw passes through a longitudinal slot 25 formed in the arrow, to permit the longitudinal adjustment of the latter for a purpose hereinafter explained. Furthermore, the arrow may be locked in the desired position of adjustment by a set screw 26 which is threaded into the holder above the arrow slot 25 and engages the arrow on oposite sides of the said slot, the construction and arrangement being such that by tightening the screw the arrow is held in the desired position of adjustment or relation with the holder. The holder and arrow considered in their assembled relation are pivotally connected with the inner extremity of the slide by means of the set screw 24 so that when the arrow is properly adjusted in the holder for the desired purpose, it may be turned on the screw 24 as a pivot until it reaches the desired position with reference to the diametrical graduated line on the disk or either radius or half thereof. The arrow, as illustrated in the drawing and in order that it may have the desired number of graduations and numbers formed thereon, is made of such length that it may extend on both sides of the bar 10, as illustrated in the drawing.

The pivotal connection of the arrow and its holder with the inner end of the slide 17 will, for convenience of reference in this specification, be termed the joint. From this joint the slide is graduated and numbered progressively from 0 to 150, the numbers, as shown in the drawing, commencing with 10 and increasing by a common difference of 10 to 150, these graduations being formed on the same scale as on the graduated diametrical line of the disk and having special relation thereto. The arrow, as shown in the drawing, is also graduated and numbered from 60 progressively to 180, the number 60 being placed at the base of the arrow head and the numbers increasing by a common difference of 10 from the arrow head toward its opposite extremity. The graduations of the arrow must be considered to have the same scale and the same value as the graduations on the slide and the graduated line of the disk, these three features being graduated and numbered with special reference to their function and coöperation in determining the problem which this instrument solves. For convenience, it is understood and the instrument is so constructed that in adjusting the arrow in its holder, the number which is exposed just beyond the extremity of the holder in the direction of flight, shall designate the distance from the joint to the point of the arrow head and in terms of the graduations on the slide and the graduated line.

For convenience of adjustment the ring 6 is equipped with a set screw 27 whose threaded shank passes through a horizontal perforation 28 formed in the ring and extending therethrough into engagement with a small friction block 29 which is arranged in a recess of counterpart shape formed in the ring adjacent the outer edge of the disk. The head of this set screw is countersunk in the vertical wall of the disk and its periphery above and below is exposed for convenience of manipulation. When this set screw is tightened, the disk is locked in the desired position of adjustment or in the proper position with reference to the other parts of the instrument for the solution of the problem under consideration. As shown in the drawing, the ring has an inner circumferential extension 30 which overlaps a similar exterior extension 31 formed on the disk, this construction being for convenience in maintaining the parts in the assembled relation.

From the foregoing description the use and operation of my improved instrument will, it is thought, be readily understood. The aviator or person about to make a flight will first adjust the disk of the instrument so that the graduated line on the disk will point in the direction of the destination or the direction of flight, after which the disk will be secured by means of the set screw 27 in the adjusted position. The bar 10 will then be adjusted so that its arrow head 16 will point in the direction in which the wind is blowing, after which the slide 17 will be adjusted on the bar so that the number on the slide which designates the velocity of the wind in miles per hour will be directly over the center of the disk. The arrow 23 will then be adjusted in its holder until the number thereon which designates the normal speed of the aeroplane in miles per hour will be exposed just beyond the extremity of the holder in the direction of the proposed flight, after which the set screw 26 will be tightened to hold the arrow in such position. The arrow and its holder will then be turned about the axis of the joint until the arrow point stands directly above the graduated line on the disk in the direction of flight. The set screw 24 will then be tightened in order to maintain the slide and arrow in the adjusted position. The point of the arrow will then indicate on the graduated line of the disk the miles per hour of the aeroplane during the proposed flight, under the existing conditions, the important ones, of course, being the velocity and direction of the wind. The slide will then be loosened by the proper adjustment of its set screw 20 and moved along the bar 10 until the joint of the arrow is directly over the center of the disk. The arrow will then point in the compass direction which the aeroplane is to assume in making the proposed flight in order that it may actually travel in the direction indicated by the graduated line and at the speed indicated by the point of the arrow on that line, when the arrow is in the full line position in Fig. 1.

In further explanation of the use of the instrument I will consider a concrete example, the known factors of which being chosen with special reference to the positions of the parts of the instrument as illustrated in the drawing. Hence, I will assume that the aviator's destination or direction of desired flight is due north and that the normal speed of the aeroplane is 100 M. P. H.; also that the direction of the wind is as indicated by the arrow point of the bar 10 on Fig. 1, that is to say, about N. 64° W. or 296°, and that its velocity in this direction is 50 M. P. H.; then when the instrument is manipulated as heretofore described, the arrow 23 will point to 110 on the graduated line of the disk in the direction of the proposed flight, thus indicating that the speed of the aeroplane in this direction will be 110 M. P. H. Furthermore, the dotted line position of the arrow in Fig. 1 after adjustment by the movement of the slide to bring the joint directly over the center of the disk, as heretofore explained, indicates the compass course with reference to which the aeroplane is to be headed or directed, or about N. 27° E. or 27°, in order that the aeroplane may travel due north at the aforesaid speed of 110 M. P. H. Should the operator desire to compute the same factors on a return trip from this destination, he will adjust the instrument so that the slide shall be in the first assumed position, or that corresponding to the full line position of the arrow in Fig. 1, after which he will loosen the joint and revolve the arrow until it touches the graduated line on the opposite side or until the arrow assumes the dotted line position with its axis of revolution at the left of the center of the disk, as shown in Fig. 1. It must be understood that the two dotted line positions of the arrow must be distinguished in this view. By the same process or manipulation as before, the necessary compass course may be quickly found. In this event for the return trip the aeroplane will have an actual velocity of 66 M. P. H. thus indicating that the wind accelerates the normal speed of the aeroplane under the conditions assumed when the destination is directly north and retards such speed when the destination is in the opposite direction or directly south.

From this it will be understood that the speed per hour of any aeroplane under given conditions in the desired direction of flight and the compass direction which the aeroplane is to assume in order to make the flight in such direction, may be quickly and easily determined by the manipulation of my instrument in the manner heretofore explained without calculation or apparatus of any kind other than the instrument itself, which may be manipulated while held in the hand of the operator.

Having thus described my invention, what I claim is:

1. An aerial navigation protractor comprising a graduated ring, a disk having a distinctive graduated line, the disk and ring being mounted to permit one to move while the other remains stationary, a bar movable about the axis of the disk as a center, a slide movable longitudinally on the bar and graduated in terms of the graduated line on the disk, and an arrow having jointed connection with the slide and graduated with reference to the graduations of the slide and the distinctive line of the disk.

2. An instrument of the class described including a graduated ring, a coöperating disk having a distinctive radial line graduated and numbered progressively from the center toward its circumference, a bar movable about the axis of the disk, a member mounted on the bar to move longitudinally thereon and graduated and numbered with reference to the graduations of the distinctive line of the disk, a second member pivotally connected with the first member, graduated with reference to the graduations of the latter, and also endwise adjustable.

3. An instrument of the class described comprising a disk, a coöperating ring, the disk having alined, graduated radii, a bar pivoted intermediate its extremities at the center of the disk, a member slidable longitudinally on the bar and graduated with reference to the graduations of the said radii of the disk, a second member having jointed connection with the first member and graduated with reference to the graduations of the slidable member and the graduated radii of the disk.

4. An instrument for determining the compass course and the speed of an aeroplane in the direction of destination when the direction and velocity of the wind, the normal speed of the aeroplane and the desired direction of flight are known, comprising a graduated ring, a pivoted disk movable in relation to the ring, a bar pivoted on the disk to indicate wind direction on the ring, a graduated slide mounted on the bar to move longitudinally thereon, and a jointed member carried by the slide and endwise adjustable.

5. An instrument for the determination of the compass course and the speed of an air craft in the direction of destination when the direction and velocity of the wind, the normal speed of the air craft and the desired direction of flight are known, comprising a graduated ring, a coöperating disk having radial lines graduated to measure aeroplane speed in the desired direction of flight, a pivoted bar adjustable on the disk to indicate the direction of the wind, a slide graduated with reference to the graduations of the radial lines of the disk, numbered to indicate wind velocity and movable longitudinally on the bar to bring a number corresponding with the velocity of the wind into position at the center of the disk, and an arrow pivotally connected with the slide and adjustable on its pivot to indicate the actual velocity of the air craft on one of the graduated lines of the disk, longitudinally adjustable to indicate the normal aeroplane speed, and movable with the slide to bring its pivot into position at the center of the disk and to indicate the compass course of the air craft.

6. An instrument of the class described comprising a base, a graduated ring secured to the base, a disk pivoted to the base within the ring and provided with a graduated diametrical line, means for securing the disk to the ring when the disk is properly adjusted, a wind direction-indicating bar pivoted at the center of the disk, means for securing the bar in fixed relation with the disk, a slide mounted to move longitudinally on the bar, means for fixing the slide in the desired position on the bar, the slide being graduated with reference to the graduations on the graduated line of the disk, an arrow jointed to the slide and movable horizontally about the axis of the joint to cause its point to intersect the graduated line of the disk, the arrow being graduated and longitudinally movable to vary its distance from the joint on the side of the bar toward the direction of flight and movable with the slide to bring the joint directly over the center of the disk.

7. An aerial navigation protractor comprising means having a curved graduated part conforming to an arc struck from a point within the said means called the center and having a graduated line passing through the said center, a bar movable about the said center as an axis, a slide movable longitudinally upon the bar and graduated with reference to the graduations of the said line, and an indicating member having jointed connection with the slide and graduated with reference to the graduations on the slide and the said line, said member being free of connection to said means whereby it may be moved bodily to said center along said bar.

8. An instrument of the class described comprising means having a curved, graduated part, the curve conforming to an arc struck from a point called the center, the said means having a graduated line extending from said center, a bar movable about from said center as an axis, a slide movable longitudinally on the bar and graduated with reference to the graduated line, and an arrow jointed to the slide and slidably adjustable relatively thereto and graduated with reference to the slide and the said line.

9. An instrument of the class described having means provided with a graduated arc and a straight graduated line passing through the center from which the arc is struck, a bar mounted to move about said center as an axis, a slide mounted to move longitudinally on said bar and graduated with reference to the graduations of the said line, and an arrow jointed to the slide and graduated with reference to the graduations of the slide and the said line, said arrow being free of connection to said means whereby it is adapted to be moved bodily longitudinally of said bar to said center without changing the angle between the arrow and the bar.

10. An instrument of the class described including means having a graduated arc and a straight graduated line passing through the center from which the arc is struck, a bar mounted to move about said center as an axis, a slide mounted on the bar, and an adjustable arrow jointed to the slide, the slide being graduated from the joint and with reference to the said graduated line while the arrow is also graduated from the joint with reference to the graduations on the said line and the slide.

11. An instrument of the class described including means having a graduated arc and a graduated line passing through the center from which the arc is struck and numbered progressively from the center in both directions, a bar mounted to move about the said center as an axis, a slide movable longitudinally on the bar and graduated with reference to the graduations of the said line, a longitudinally adjustable arrow jointed to the slide and graduated with reference to the graduations on the slide and the said line, the graduations on the slide being numbered progressively from the joint while the graduations on the arrow are numbered from the joint toward the arrow point in the reverse order.

12. An instrument of the class described including means having a graduated line passing through a point therein, a bar pivoted to move about said point as an axis, a slide movable on the bar and graduated with reference to the graduations of the said line, and a longitudinally adjustable member jointed to the slide and graduated with reference to the graduations on the said line and the said slide.

13. An instrument of the class described including means having a graduated line passing through a point therein and numbered progressively from the said point in both directions, a bar pivoted to move about said point as an axis, a slide movable on the bar and graduated with reference to the graduations of the said line, and a longitudinally adjustable member jointed to the slide and graduated with reference to the graduations on the line and the said slide, the graduations on the slide being numbered progressively from the joint, while the graduations on the jointed member are numbered from the joint in one direction in the reverse order.

14. An instrument including means marked with radial lines from a common center, one of these lines to represent a directional factor and graduated to any convenient scale, a movable part rotating upon the same center and representing another directional factor and capable of being set at any angle to said graduated line, a pivoted part whose length may be adjusted and set according to the scale already established, this pivoted part being slidable along the part representing the second directional factor so that it may be set at any distance from the center radially, according to the same scale, thus solving mechanically a parallelogram of forces, the movable part representing the resultant, being so fixed that it may be moved to the center of the instrument and its course read directly.

In testimony whereof I affix my signature.

ROBERT H. SAYRE.